United States Patent [19]

Weaver

[11] 4,039,340

[45] Aug. 2, 1977

[54] HIGH STRENGTH AND HEAT RESISTANT REFRACTORY COMPOSITIONS

[75] Inventor: Gerald Q. Weaver, Princeton, Mass.

[73] Assignee: Norton Company, Worcester, Mass.

[21] Appl. No.: 614,701

[22] Filed: Sept. 18, 1975

Related U.S. Application Data

[63] Continuation-in-part of Ser. No. 582,781, June 2, 1975, abandoned.

[51] Int. Cl.² ............................................. C04B 35/58
[52] U.S. Cl. .................................... 106/55; 106/73.2; 106/73.5
[58] Field of Search .................... 106/55, 73.2, 73.5

[56] References Cited

U.S. PATENT DOCUMENTS

| | | | |
|---|---|---|---|
| 2,636,828 | 4/1953 | Nicholson | 106/55 |
| 3,830,652 | 8/1974 | Gazza | 106/73.5 |

*Primary Examiner*—J. Poer
*Attorney, Agent, or Firm*—Arthur A. Loiselle, Jr.

[57] ABSTRACT

Silicon nitride based refractory articles with flexural strengths at room temperature of up to 150,000 p.s.i. and at 1375° C of up to about 117,000 p.s.i. result when mixtures of 80 to 98.5% by weight of silicon nitride, 1 to 15% by weight of yttrium oxide, and 0.5 to 10% by weight of thorium oxide are pressure sintered according to conventional methods.

9 Claims, 1 Drawing Figure

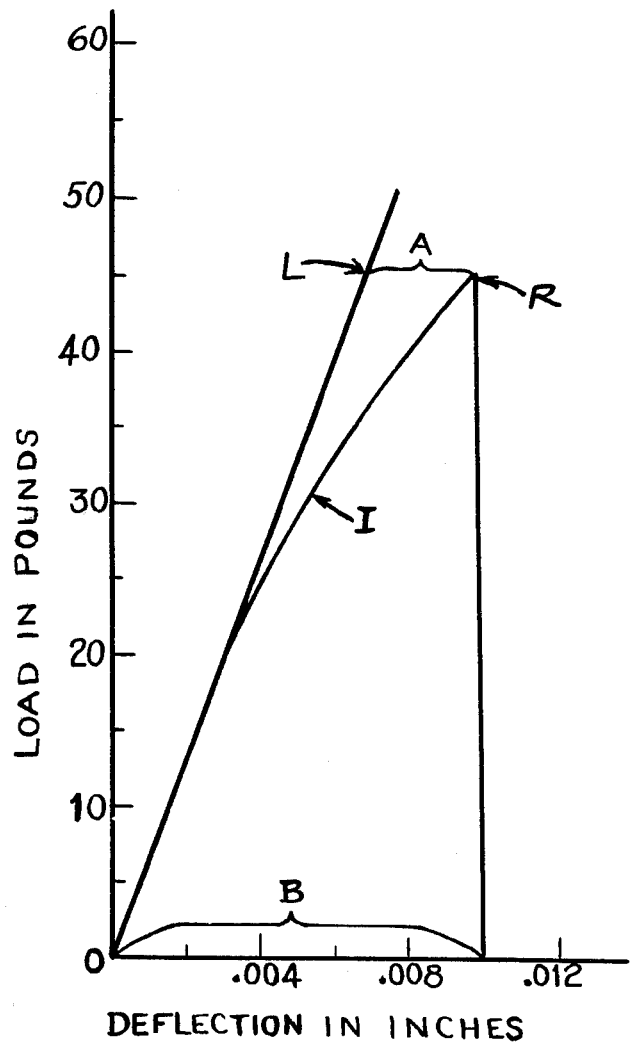

HIGH STRENGTH AND HEAT RESISTANT REFRACTORY COMPOSITIONS

BACKGROUND OF THE INVENTION

This application is a continuation-in-part of my copending application Ser. No. 582,781, filed June 2, 1975 now abandoned.

The invention relates to silicon nitride refractory articles. More particularly, the invention relates to high density silicon nitride composites wherein although silicon nitride is the main constituent, substantial quantities of a second and a third material are present.

Interest in silicon nitride as a structural material for high temperature applications has intensified in recent years with a major impetus being the recent, and still existing, energy crisis. The major characteristics of this material which have given rise to this high level of interest, are the material's exceptionally high mechanical strength both at room temperature and at elevated temperatures, its resistance to thermal shock, and its resistance to chemical degradation particularly oxidation. There are an infinite number of potential uses for a structural material with the properties of silicon nitride such as sophisticated applications like turbine rotors, stators and nozzles for turbine engines, and electrical insulators, forging dies, as well as the more conventional refractory products such as thermocouple tubes, kiln furniture, crucibles and the like for the metal processing industry.

The properties of sintered silicon nitride articles are dependent on the method of fabrication. For optimum mechanical strength, oxidation resistance, and resistance to thermal shock, silicon nitride articles fabricated by the pressure sintering or so-called hot-pressing technique are the more desireable. Contrarywise, if the article to be manufactured is very complex in shape and the situation can tolerate poorer mechanical properties, creep resistance, and resistance to thermal shock, then the straight sintering or so-called reaction sintering techniques may be used. Although the present invention is not limited to hot-pressed types of products they are by far the preferred articles.

Those prior art silicon nitride based refractory articles of the highest quality are not fabricated from silicon nitride alone. For an example British Pat. No. 942,082 to the National Research and Development Corp. discloses sintered silicon nitride articles which contain up to 10% by weight of a finely divided silicon carbide dispersed therein. U.S. Pat. No. 3,468,992 by Eugene Lubatti et al. further complicates the silicon nitride-silicon carbide composition by additions thereto of up to 25% by weight of boric acid, boric anhydride, or a boron salt to the initial powder mixture.

The additional materials added to the silicon nitride are commonly referred to as sintering aids or densification aids although the role these materials play in the hot-pressing of the silicon nitride composite is probably highly oversimplified by such a label. According to the Plessey Co. Ltd. British Pat. No. 970,639 magnesium oxide, magnesium nitride, beryllium oxide, beryllium nitride, calcium oxide, calcium nitride, aluminum oxide, and ferric oxide are all effective densification aids when used in quantities of from 0.1 to 25% by weight with the preferred amount being approximately 5% by weight. Improved silicon nitride articles are formed, according to U.S. Pat. No. 3,549,402 by Ellsworth D. Whitney et al., by first reacting stoichiometric quantities of silicon nitride and lithium nitride at 1200° C. in a nitrogen atmosphere resulting in reaction between the two to form a new compound lithium silicon nitride. The new compound is then hot-pressed into the desired article.

Silicon nitride bonded refractory oxide articles are formed, following the teachings of U.S. Pat. No. 2,636,828 by Kenneth C. Nicholson, by blending 50% or more by weight of thorium oxide, aluminum oxide, beryllium oxide, or zirconium oxide with finely powdered silicon metal, forming the mixture into a desired configuration and nitriding by for example, heat treating the preform in a nitrogen atmosphere at a temperature of from 1300° to 1400° C. for 12 hours thereby resulting in the essentially complete conversion of the silicon to silicon nitride. The composites contain up to 75% by weight of one of the aforementioned oxides. The resulting physical properties of these composites are set out in Table I of the patent. The modulus of rupture at room temperature of specimens made within the compositional parameters of the patent, range from a low of 2550 p.s.i. for 75% MgO — 25% Si to a high of 10,500 p.s.i. for the composition which resulted from an original mixture composition of 50% $ZrO_2$ — 50% Si Metal. A close runner-up was 50% $ThO_2$ — 50% Si metal with a modulus of rupture at room temperature of 9150 p.s.i.

A novel refractory composition based on aluminum nitride is disclosed by Camille A. Lenie et al. in U.S. Pat. No. 3,108,887. Refractory articles are produced with good thermal shock resistance, strength properties, and chemical inertness by pressure sintering (hot-pressing) finely powdered aluminum nitride alone or aluminum nitride powder admixed with one or more compounds having the formula MX where M is aluminum, silicon, boron, the rare earth, or the refractory transition metals, and X which is different than M and is oxygen, boron, nitrogen, silicon, or carbon. Specifically mentioned as possible additives to the aluminum nitride are aluminum oxide, thorium oxide, zirconium oxide, magnesium oxide, and silicon nitride. Preferably the aluminum nitride and the additive are milled to a particle size of less than 10 microns and are blended to a relatively homogeneous mixture. Said mixture is then pressure sintered, i.e., hot-pressed at for example a pressure of at least 1000 p.s.i. at about 1800° C. to produce a sintered product which is at least 90% of the theoretical density thereof. Test specimens which were 98% of theoretical density exhibited moduli of rupture of 38,500 p.s.i. at 25° C., 27,000 p.s.i. at 1000° C., and 18,100 p.s.i. at 1400° C.

U.S. Pat. No. 3,833,389 by Katsutoshi Komeya et al. is also concerned with nitride based high strength and heat resistant refractory compositions. According to that part of the reference which is most relevant to the instant invention, aluminum nitride or silicon nitride is modified by the addition thereto of a second and a third component. The second component is a powdered oxide of lanthanum, cerium, scandium, yttrium, or yttrium aluminum garnet. The third component is either powdered or fibrous silicon carbide, boron nitride, or carbon. The particle size of the powders is 0.4 to 40 microns and the fibers have a diameter of 0.5 to 40 microns and a length of 40 to 100 microns.

Hot-pressed silicon nitride containing from 1.0 to 3.5% by weight of a yttrium compound is disclosed by George E. Gazza in U.S. Pat. No. 3,830,652. The yttrium compound may be yttrium oxide, yttrium chloride or yttrium nitrate.

The refractory shapes can be made by both the ordinary sintering method, i.e., cold forming to the desired shape following by heat treatment at atmospheric pressure; or by pressure sintering or hot-pressing in the known manner. The Komeya et al reference discloses the combination of 1 to 97% by weight of the first component, i.e., aluminum nitride or silicon nitride; 1 to 50% by weight of the second component; and 1 to 50% by weight of the third component. There was no mechanical strength data given for those mixtures wherein silicon nitride was the base component. However, composites of silicon nitride-yttria-carbon and silicon nitride-yttria-silicon carbide exhibited high resistance to heat shock.

SUMMARY OF THE INVENTION

It has been found that while the mechanical strength and creep resistance of silicon nitride at 1375° C. increases with increasing additions thereto of up to about 15% by weight of yttrium oxide, these properties are extremely poor at 1000° C. if the yttrium oxide exceeds about 8% by weight. However, when incremental additions of thorium oxide are made to the silicon nitride-yttrium oxide compositions, the severe degradation at 1000° C. can be decreased or eliminated. When the combination of yttrium oxide and thorium oxide are added to the silicon nitride, the total addition should not exceed about 20% by weight of the total composition. The yttrium oxide may constitute from 1 to 15% by weight, and the thorium oxide from 0.5 to 10% by weight of the total composition. For optimum properties at both 1000° C. and 1375° C., however, it is believed that from 3 to 7% yttrium oxide and 3 to 7% thorium oxide are the preferred compositional ranges for the reason set out above, viz. that at yttrium oxide additions of greater than 8%, the 1000° C. properties of the resulting silicon nitride composites are detrimentally effected. Obviously, when the composition of the present invention is to be used in an environment that will spend no great amount of time at about 1000° C. then larger quantities of yttrium oxide may be utilized along with correspondingly lower amounts of thorium oxide to produce superior modified silicon nitride composites.

Refractory composites which have excellent mechanical strengths, creep resistance, and resistance to thermal shock result from sintering specific mixtures of silicon nitride, a thorium compound, and a yttrium compound. Other yttrium compounds such as the chloride, nitrate, sulfate, acetate, hydroxide, oxalate, and the like are also amenable to the practice of the present invention although the oxide is generally preferred. Similarly, the chloride, nitrate, carbonate, hydroxide, sulfate, oxalate and the like of thorium may be utilized, again however the oxide is preferred. In any event the yttrium should be present in an amount of from 0.79 to 11.8% and the thorium present in an amount of 0.44 to 4.4%, both by weight of the total composition including the silicon nitride. For excellent properties at 1375° C., weight percent ranges of yttrium and thorium of 2.36 to 10.2% and 0.86 to 2.64% respectively are needed. These ranges of yttrium and thorium introduce into the system from 0.78 to 3.16% by weight of oxygen. Sintered composites of 80 to 98.5% by weight of silicon nitride, 1 to 15% by weight of yttrium oxide and 0.5 to 5% thorium oxide, result in 3 point cross-bending strengths of at least about 100,000 p.s.i. at room temperature and of at least 70,000 p.s.i. at 1375° C. For optimum strength characteristics, the powdered composition is pressure sintered, i.e., hot-pressed, although the present compositions are amenable to ordinary sintering processes.

Of major importance is the fact that hot-pressed silicon nitride-thorium oxide-yttrium oxide compositions of the instant invention retain a major portion of their original mechanical strength, when subjected to extremely high temperatures, e.g., 1375° C. as compared to for example, the best commercial silicon nitride compositions (containing about 1.5% MgO as a sintering aid). The invention composition of 85.7% $Si_3N_4$, 12.8% $Y_2O_3$, and 1.5% $ThO_2$, all percents by weight, has a cross-bending strength of 153,484 p.s.i. at room temperature and 117,563 p.s.i. at 1375° C. representing a drop in strength as a result of the thermal treatment of only about 23.5%. The poorest weight percent composition of the invention is 97.2% $Si_3N_4$, 1.4% $Y_2O_3$, and 1.4% $ThO_2$ which has a room temperature cross-bending strength of 114,983 p.s.i., and 68,250 p.s.i. at 1375° C. for a percent drop of about 40.5%. By comparison, the high quality magnesia containing silicon nitride mentioned above has the very impressive room temperature strength of 140,000 p.s.i. in cross-bending, which drops drastically to 50,000 p.s.i. at 1375° C., a decrease of about 64.3%.

The significance of the instant advance over the prior art is readily apparent when the utilization of these $Si_3N_4$-$Y_2O_3$-$ThO_2$ compositions is considered in structural refractories and particularly for turbine engine components.

BRIEF DESCRIPTION OF THE DRAWING

The drawing is a load-deflection curve generated in a cross-bending test on a silicon nitride composition.

DESCRIPTION OF THE PREFERRED EMBODIMENTS

Although the compositional parameters of the present invention are relatively broad, as set-out above, optimum properties are obtained in the finished sintered product when the composite contains 12 to 13% yttrium oxide and 1 to 3% thorium oxide. Similarly, the sintering may be accomplished by cold forming the powder mixture into the desired shape and then firing in a conventional sintering furnace or by the well-known reaction-bonding technique, resulting in densities of from 65 to as high as 90% of theoretical density; however the preferred process is hot-pressing. The hot-pressing process is also well known. The refractory powder to be formed is placed in an appropriately designed graphite mold apparatus or set-up. The assembly of the mold set-up is completed and placed in a hot-pressing furnace. The entire set-up is heated so as to bring the temperature of the mass of powder up to 1500° to 2000° C. Pressure is then applied of at least 500 p.s.i. and preferably of the order of at least 2000 p.s.i. The preferred hot-pressing temperature is approximately 1750° C. The resulting product will have a density of at least 90–94% and preferably 98% of the theoretical density of any given composition within the scope of this application.

The particle size of the powders employed should have an average particle size of less than 10 microns. Where the standard sintering process is used particle size and particle size distribution play a more dominant roll in the density of the final product than where hot-pressing is employed. However, in both processes an average particle size in excess of 50 microns is undesireable with the preferred average particle size being less than 5 microns but at least below 10 microns.

The following are examples of the preferred compositions of the present invention, using the oxides of yttrium and thorium, made according to the best mode presently known to the applicant.

EXAMPLES A THROUGH H

Sets of cross-bending test specimens measuring 2 inches to 3 inches long by ⅛ inch × ⅛ inch were fabricated from several compositions according to the present invention and identified as Examples A through H. In a like manner, control cross-bending test specimens were made having a composition of approximately 98.5% silicon nitride and 1.5% magnesium oxide. The various compositions employed are listed below.

200 grams of $Si_3N_4$ powder was added to a tungsten carbide lined milling jar one-third full of ½ inch tungsten carbide balls. To this was added the required amounts of magnesium oxide, or yttrium oxide and thorium oxide to give the weight percent compositions listed in the table below. Finally, 400 milliliters of either isopropanol or methanol was added to the contents of the jar. The mix was milled for 16 hours after which it was screened through a 500 mesh screen and dried at 90° C. The resulting cake was broken up by tumbling in a plastic jar containing tungsten carbide balls, for about 15 minutes.

The entire quantity of mix was then placed in a boron nitride coated grahite mold having a 3 inch diameter round cavity therein. The rest of the mold was assembled and the mix contained therein was hot-pressed at 1750° C. and a pressure of 3500 p.s.i. to essentially theoretical density. The hot-pressed piece measured 3 inches in diameter and approximately one-half inch thick. Test bars or specimens measuring from 2 to 3 inches long, by one-eighth by one-eighth inch were cut from the 3 × ½ inch disc.

The test specimens were broken on an Instron machine in 3 point loading, using a 1 inch span and a 0.02 inch/minute cross-head speed, both at room temperature and at 1375° C. The results are tabulated below.

Also tabulated below, is a set of data identified as Deviation From Linearity. This is a relative measure in percent of the degree that the sample deviates in its elastic behavior from ideal elasticity for a given material, which would be a straight line plot of load versus deflection. The more the actual load deflection curve deviates from the straight line behavior of the ideal load deflection curve, the greater is the amount of non-elastic deformation taking place in the sample. While it is difficult to attribute this deviation from linearity at elevated temperature testing, to any specific phenomenon, it can be generally stated that the deviation from linearity is a qualitative indication of the comparative creep test specimens will exhibit when subjected to a constant stress for a prolonged period of time. Thus, a material which exhibits a small deviation from linearity at 1375° C. will have better creep properties (i.e., less creep) when tested under constant stress at that temperature, than will a material which exhibits a large deviation from linearity. Referring to the drawing, the curve I is an actual load-deflection curve charted by an Instron machine while subjecting a prior art silicon nitride-magnesium oxide test specimen to a cross-bending load, using 3 point loading, a 1 inch span, 0.02 inch/minute cross-head speed, a chart speed of 5 inches per minute, and test specimens measuring 2 to 3 inches × ⅛ × ⅛ inch.

In the drawing L is the hypothetical straight line representing ideal elastic behavior for the composition being tested. R is the point of rupture of the test specimen. The closer the actual curve I comes to the ideal straight line L the smaller is the amount of non-elastic deformation. The difference A between the actual curve I and the ideal curve L at the point of rupture R, divided by the total amount of deflection B at the point of rupture, multiplied by 100 gives the percent deviation from linearity. The practical significance of this measurement will be elaborated on in the discussion of the results immediately following the table of data.

| Example | Composition** | Deviation from Linearity | Cross Bending Strength* Rm. Temp. | at 1375° C. | Density |
|---|---|---|---|---|---|
| Control | 1.5% MgO | 26.0% | 140,000 psi | 50,000 psi | |
| A | 12.8% $Y_2O_3$–1.5% $ThO_2$ | 0 " | 153,484 psi | 117,563 psi | 3.43 g/cc |
| B | 12.6% $Y_2O_3$–2.9% $ThO_2$ | 0 " | 142,148 psi | 94,688 psi | 3.48 g/cc |
| C | 2.8% $Y_2O_3$–2.8% $ThO_2$ | 0 " | 129,109 psi | 76,313 psi | 3.40 g/cc |
| D | 3.7% $Y_2O_3$–2.8% $ThO_2$ | 0 " | 122,273 psi | 75,563 psi | 3.43 g/cc |
| E | 1.9% $Y_2O_3$–2.8% $ThO_2$ | 0 " | 106,482 psi | 70,500 psi | 3.31 g/cc |
| F | 1.0% $Y_2O_3$–2.9% $ThO_2$ | 0.82% | 102,279 psi | 59,625 psi | 3.26 g/cc |
| G | 2.8% $Y_2O_3$–1.4% $ThO_2$ | 0 " | 107,494 psi | 72,188 psi | 3.34 g/cc |
| H | 1.4% $Y_2O_3$–1.4% $ThO_2$ | 0 " | 114,983 psi | 68,250 psi | 3.27 g/cc |

*3 point bending, 1" span, cross-head speed 0.02"/min.
**wt. % added to $Si_3N_4$ The prior art silicon nitride containing 1.5% by weight of magnesium oxide possesses the very impressive room temperature strength of 140,000 p.s.i. However, when this material is heated to 1375° C. the strength decreases to a low of 50,000 p.s.i., retaining only 36% of its room temperature strength.

By contrast, the poorest composition of the present invention, Example F, has a lower room temperature strength than the prior art material but at 1375° C. retains about 58% of its room temperature strength; more importantly, the strength at 1375° C. of the composition of Example F is about 19% higher than the 1375° C. strength of the prior art MgO containing composition. Note that Example F is the poorest of the compositions of the instant invention; all of the other compositions possess even more superior 1375° C. strengths with Example A having a room temperature strength of 153,484 p.s.i. and a strength at 1375° C. of 117,563 p.s.i. This latter figure is twice as strong as the prior art material.

If the material is to be used in a dynamic state at elevated temperature, e.g., in a turbine engine rotor, then the creep properties at high temperatures, become important. If the strength of the material is adequate at high temperatures, but the material creeps so as to cause a change in size under stress, than the close dimensional limits required, e.g., in a turbine engine, would rule out the use of this material.

The prior art magnesia containing silicon nitride suffers from this undesireable property as indicated by the 26% deviation from linearity shown in the table above. Combining this with the relatively low, i.e., 50,000 p.s.i. cross-bending strength of the material makes it useless, in such applications.

The deviation from linearity of all of the compositions of the present invention are zero with the exception of Example F which has the very low value of 0.82. Thus these compositions would exhibit an extremely low amount of creep or growth under stress at elevated temperatures at least up to 1375° C. The deviation from linearity should be preferably substantially less than 15%. Couple this with the superior strength properties, particularly of Example A, and the advancement over the prior art is apparent.

Due to the extreme difficulty of qualitatively analyzing refractory systems such as the present one, the exact composition of the final sintered product is not known. The properties which the final product exhibit, suggest the possiblity that said product is more complex than simply a sintered physical mixture of silicon nitride, a yttrium compound, and a thorium compound.

What is claimed is:

1. A heat resistant high strength refractory composite produced by sintering a mixture consisting essentially of from 80 to 98.5% by weight of silicon nitride, 1 to 15% by weight of yttrium oxide, and 0.5 to 10% weight of thorium oxide, with the total oxide present not exceeding about 20%.

2. The refractory composite of claim 1 wherein said mixture consists essentially of from 86 to 94% by weight of silicon nitride, 3 to 7% by weight of yttrium oxide, and 3 to 7% by weight of thorium oxide.

3. A high strength refractory composite produced by sintering a mixture of from 80 to 98.5% by weight of silicon nitride, 1 to 15% by weight of yttrium oxide, and 0.5 to 5% by weight of thorium oxide, said sintered refractory composite having a density of at least 90% of theoretical density.

4. A refractory article having high strength at room temperature and at 1375° C., resulting from the sintering of a mixture consisting essentially of from 84 to 87% by weight of silicon nitride, 12 to 13% by weight of yttrium oxide, and 1.0 to 3% by weight of thorium oxide, said refractory article having a density of at least 98% of theoretical density, a room temperature strength of at least 100,000 p.s.i., and a strength at 1375° C of at least 70,000 p.s.i., said strengths being cross-bending strengths measured under 3 point loading.

5. A refractory composition produced by sintering a mixture of from 80 to 98.5% by weight of silicon nitride, 1 to 15% by weight of yttrium oxide, and 0.5 to 5% of thorium oxide, said refractory composition having a density at least 65% of theoretical density, and a deviation from linearity substantially less than 26%.

6. The refractory composition which results from sintering a mixture of 84 to 87% by weight of silicon nitride, 12 to 13% by weight of yttrium oxide, and 1 to 3% by weight of thorium oxide, said refractory composition having a density of at least 98% of theoretical density; a room temperature strength of at least 100,000 p.s.i., and a strength at 1375° C. of at least 70,000 p.s.i., said strengths being cross-bending strengths measured under 3 point loading; and wherein the deviation from linearity is substantially less than 15%.

7. A monolithic refractory composition based on silicon nitride including from 0.79 to 11.8% by weight of yttrium and 0.44 to 4.4% by weight of thorium said yttrium and said thorium being present in said silicon nitride as covalently bonded compounds, said refractory composition having a density of at least 65% of theoretical density.

8. The monolithic refractory composition of claim 7 wherein said yttrium is present in an amount of from 2.36 to 10.20% by weight; said thorium is present in an amount of 0.86 to 2.64% by weight; and wherein said refractory composition has a density of at least 90% of theoretical density, a room temperature strength of at least 100,000 p.s.i., and a strength at 1375° C. of at least 70,000 p.s.i., said strengths being cross-bending strengths measured under 3 point loading.

9. The refractory composition of claim 8 including from 0.78 to 3.16% by weight of oxygen.

* * * * *